United States Patent [19]

Hearn

[11] Patent Number: 4,932,920
[45] Date of Patent: Jun. 12, 1990

[54] BOX-TYPE TURKEY CALLER WITH SCALLOPED ACTUATOR

[76] Inventor: Larry J. Hearn, Rte. 1, Box 217, Medon, Tenn. 38356

[21] Appl. No.: 384,528

[22] Filed: Jul. 27, 1989

[51] Int. Cl.⁵ .............................................. A63H 5/00
[52] U.S. Cl. ...................................... 446/397; 446/421
[58] Field of Search ............... 446/397, 487, 418, 420, 446/421, 422; 43/1, 2

[56] References Cited

U.S. PATENT DOCUMENTS

| | | | |
|---|---|---|---|
| 574,534 | 1/1897 | Gibson | 446/397 |
| 1,965,996 | 7/1934 | Wilder | 446/397 |
| 2,511,403 | 6/1950 | Fleener | 446/397 |
| 2,642,699 | 6/1953 | Green | 446/397 |
| 3,100,948 | 8/1963 | Tax | 446/397 |
| 4,343,108 | 8/1982 | Lee | 446/397 |
| 4,527,985 | 7/1985 | Zoschg et al. | 446/397 |
| 4,664,641 | 5/1987 | Hearn et al. | 446/397 |
| 4,836,822 | 6/1989 | Finley et al. | 446/397 |
| 4,846,753 | 7/1989 | Langston | 446/397 |

Primary Examiner—Robert A. Hafer
Assistant Examiner—Sam Rimell
Attorney, Agent, or Firm—Clifton Ted Hunt

[57] ABSTRACT

A box-type turkey caller has an actuator with at least one scalloped edge, enabling the actuator to be moved against the box with a measured rhythm to simulate the sound of a turkey purr.

5 Claims, 2 Drawing Sheets

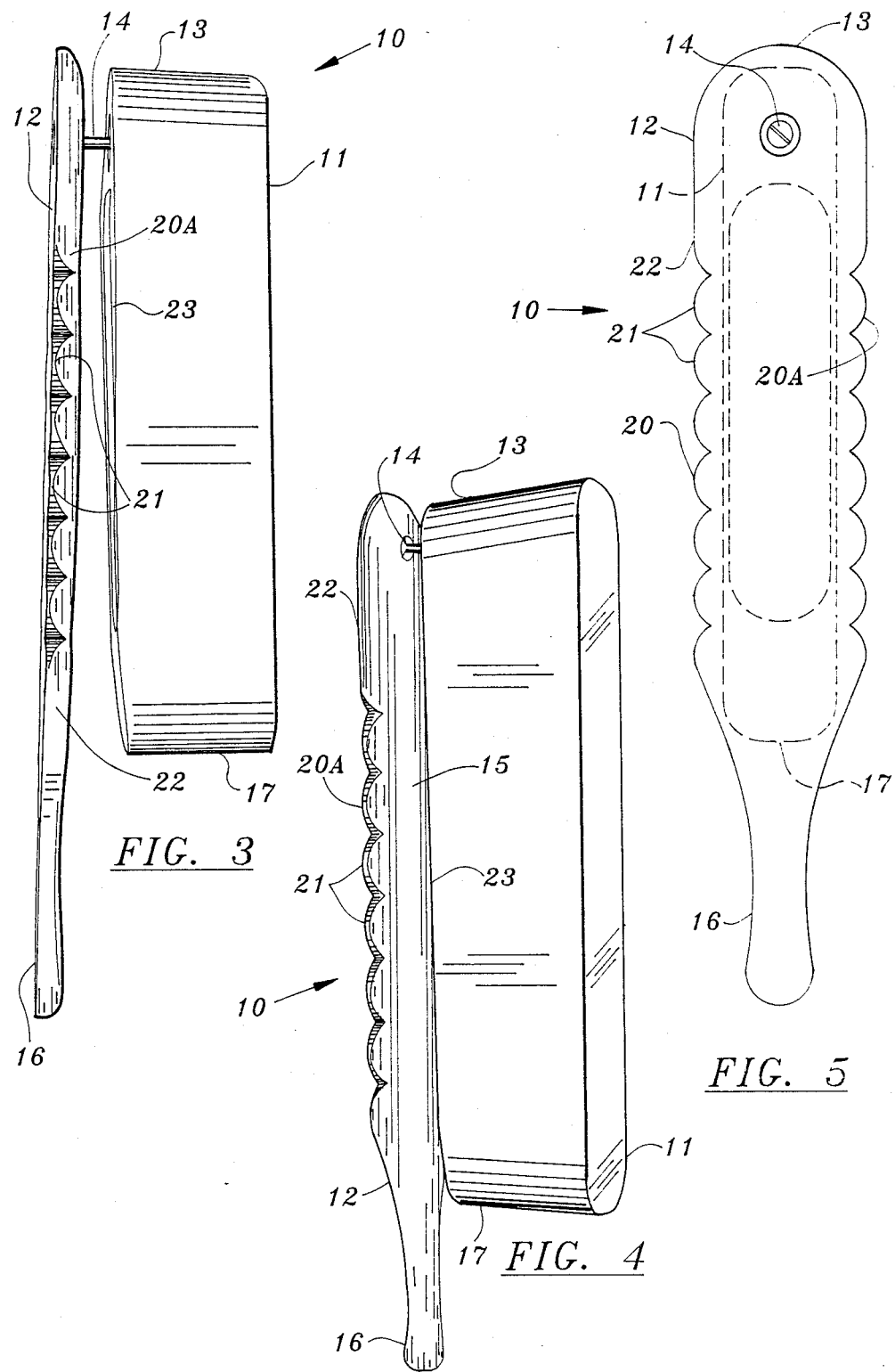

BOX-TYPE TURKEY CALLER WITH SCALLOPED ACTUATOR

FIELD OF THE INVENTION

This invention relates to turkey callers and more specifically to a box type turkey caller with a scalloped actuator capable of regulating sounds.

BACKGROUND OF THE INVENTION

Box-type callers for attracting wild game birds have long been known. See, for example, the following patents:

| PATENT NO. | ISSUE DATE | INVENTOR | TITLE |
| --- | --- | --- | --- |
| 574,534 | Jan 5, 1897 | Gibson | TURKEY CALLER AND GOBBLER |
| 2,511,403 | June 13, 1950 | Fleener | SOUND PRODUCING DEVICE |
| 3,100,948 | Aug 20, 1963 | Tax | WILD FOWL CALL |
| 3,793,767 | Feb 26, 1974 | Pulley | CRANK OPERATED REEDLESS TURKEY CALL |
| 4,310,986 | Jan 19, 1982 | Jacobs | GAME CALL |
| 4,343,108 | Aug 10, 1982 | Lee | DOUBLE DEEP TONE GOBBLER TURKEY CALL |
| 4,664,641 | May 12, 1987 | Hearn | BOX TYPE TURKEY CALL WITH ECCENTRICALLY MOUNTED ACTUATOR |

A box-type turkey caller conventionally includes a box and an actuator pivotally mounted to one end of the box. A noise simulating the call of a turkey is produced by imparting movement to the actuator relative to the box, as by rubbing the actuator against the upper edge of one side of the box. In practice, the box is held in one hand and the actuator is held in the other hand and manipulated against the upper edge of a side wall.

Box-type turkey callers are generally made of wood and take the form of an elongated upwardly open box having laterally spaced side walls joined by a bottom wall. The side walls have arcuate upper edges. The pivotal actuator extends over the top of the box for lateral reciprocation against the upper edges of the side walls. The actuator has a rounded lower surface which is conventionally coated with chalk or resin and a noise is emitted by moving the rounded lower surface of the actuator against the upper edge of one of the side walls. A box-type turkey caller of the type described is disclosed in Gibson U.S. Pat. No. 574,534.

It is known in the prior art to modify the Gibson structure to enable the emission of different sounds to simulate different types of turkey calls. The Tax U.S. Pat. No. 3,100,948, for example, obtains variations in the sound by providing a slate bar extending transversely of the actuator and movable along the length of the actuator to engage the side walls of the box at different places to produce different sounds.

My earlier U.S. Pat. No. 4,664,641 shows a box-type turkey caller with a conventional box and actuator that is capable of producing different sounds by adjusting the actuator longitudinally and laterally of the box to present selected surfaces for frictional engagement before rubbing the actuator against one of the side walls in the usual manner.

No turkey caller, to applicant's knowledge, is capable of a measured spacing of purr notes whereby one can achieve reliable consistency of the spacing between notes.

SUMMARY OF THE INVENTION

It is an object of this invention to provide a box-type turkey caller with the usual open topped box and pivotal actuator, but wherein at least one longitudinal edge of the actuator is scalloped to enable a measured rhythm of sound. A noise is made with a measured rhythm, closely simulating the purr of a turkey, when the scalloped edge is manually stroked to thereby reciprocably move the actuator against the box. The regulary spaced reciprocatory movement of the actuator relative to the box produces the purring sound.

BRIEF DESCRIPTION OF THE DRAWINGS

FIG. 3 is a side view of the box and actuator, illustrating the preferred looseness of their pivotal connection;

FIG. 4 is a perspective view looking at the side shown in FIG. 3 and illustrating the actuator in the operative position of FIG. 1; and FIG. 5 is a top plan view of the actuator, showing the box in dotted lines.

DETAILED DESCRIPTION OF THE INVENTION

Figure 1:
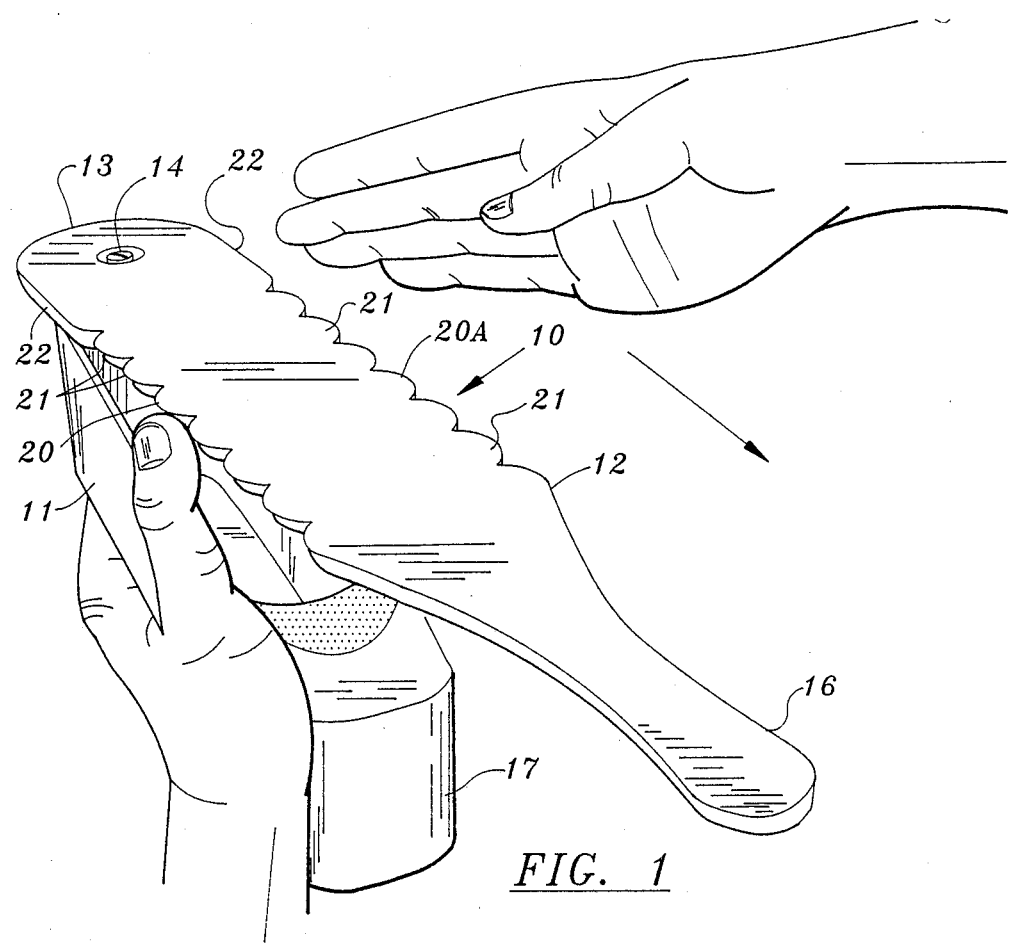
FIG. 1 is a perspective view illustrating the operative positions of the scalloped actuator and box.
Figure 2:
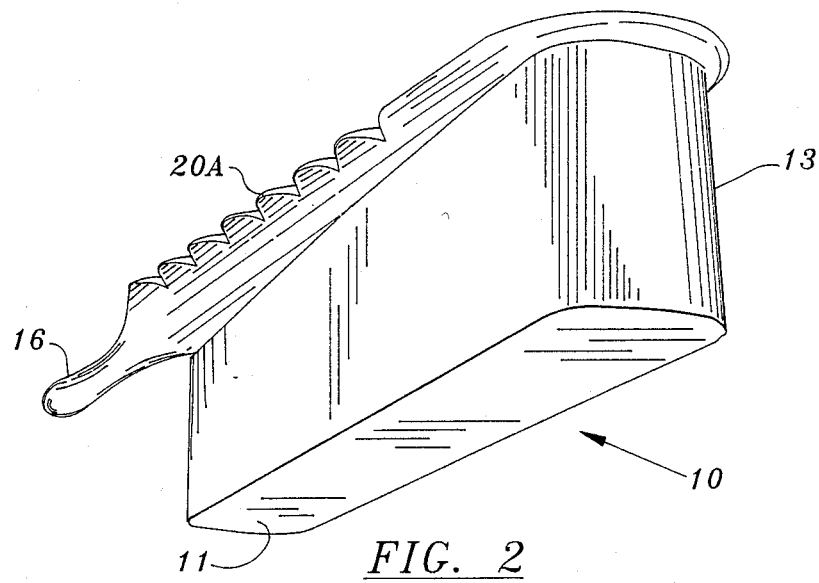
FIG. 2 is a perspective view of the box and actuator looking at the end and side not shown in FIG. 1.

Referring more specifically to the drawings, a box-type turkey caller is broadly indicated at 10. The caller 10 comprises a box 11 and an actuator 12 loosely interconnected at a common end 13 by a screw hinge 14 loosely penetrating the actuator and threadably embedded in the box.

The box 11 is of conventional construction and a further description of it is deemed unnecessary to an understanding of the present invention.

The actuator 12 is of generally conventional construction, including the usual rounded bottom 15 and handle 16 normally extending beyond the end 17 of the box 11. It is, therefore, possible to use the box-type turkey caller of this invention to make all of the noises simulating turkey calls that are possible with a conventional box-type turkey caller.

The novel feature of the present invention is the provision of scalloped edges 20 and 20A along the longitudinal sides of the actuator 12. Although only one scalloped edge is required for successful practice of the invention, it is preferred that both longitudinal edges of the actuator be scalloped for the convenience of both left handed and right handed operators.

The scalloped edges 20 and 20A are each defined by a plurality of uniformly spaced and uniformly shaped arcuate segments 21 formed along the longitudinal edges 22 of the actuator 12. In the illustrated embodiment, seven scallops have been provided on each side of the actuator, each having a longitudinal dimension along its base of ⅜ of an inch and a lateral or radial dimension of 5/16 of an inch. Satisfactory results have been obtained with a scalloped edge of these dimensions but the dimensions are not critical.

To successfully simulate the purr of a turkey, the operator grasps the box 11 with one hand, such as the left hand shown in FIG. 1, and gently clamps the edge 20 of the actuator 12 against the box. The hinge screw 14 is of sufficient length to permit the actuator 12 to be spaced from the box 11, as shown in FIG. 3. This loose fit enables the portion of the rounded bottom near the opposite edge 20A of the actuator to be slightly spaced from the corresponding edge 23 of the box 11, as shown in FIG. 4.

The operator strokes the scalloped edge 20A in the direction of the arrow 24 in FIG. 1. As the operator's hand successively moves between and against the arcuate segments 21, the actuator is reciprocably moved against the edge 23 of the box 11. A noise is produced when the actuator moves against the edge 23. The noise stops when the actuator moves away from the edge 23. The result is a noise with a regular rhythm, closely simulating the purr of a turkey.

The regular spacing of the segments 21 permits a measured spacing of purr notes, whereby one can achieve reliable consistency.

Variations, within the scope of the appended claims, may be made in the illustrated embodiment without departing from the spirit of the invention.

I claim:

1. In a box type turkey caller having an open topped box with side walls and end walls, an actuator extending across the top of the box and between the end walls of the box, a handle extending from one end of the actuator and beyond one of said end walls and means connecting the end of the actuator opposite the handle to the corresponding end of the box for reciprocal movement of the actuator against a selected side wall, the improvement which comprises a series of scallops on at least one longitudinal edge of the actuator between the handle and the end of the actuator connected to the box, whereby the scalloped edge may be stroked while the actuator is held against the box to produce a sound simulating the purr of a turkey.

2. A box type turkey caller according to claim 1 wherein there are two series of scallops on the actuator.

3. A box type turkey caller according to claim 2 wherein there are at least seven scallops in said series of scallops.

4. A box type turkey caller according to claim 1 wherein the scallops are defined by arcuate segments of uniform dimensions that are uniformly spaced apart.

5. A box type turkey caller according to claim 1 wherein there are at least seven scallops in said series of scallops.

* * * * *